July 19, 1960  K. G. SHAW  2,945,746
PROCESS FOR RECOVERING IODIDES FROM AQUEOUS SOLUTIONS BY
ION EXCHANGE AND CONVERSION OF THE IODIDES TO IODINE
Filed May 28, 1959
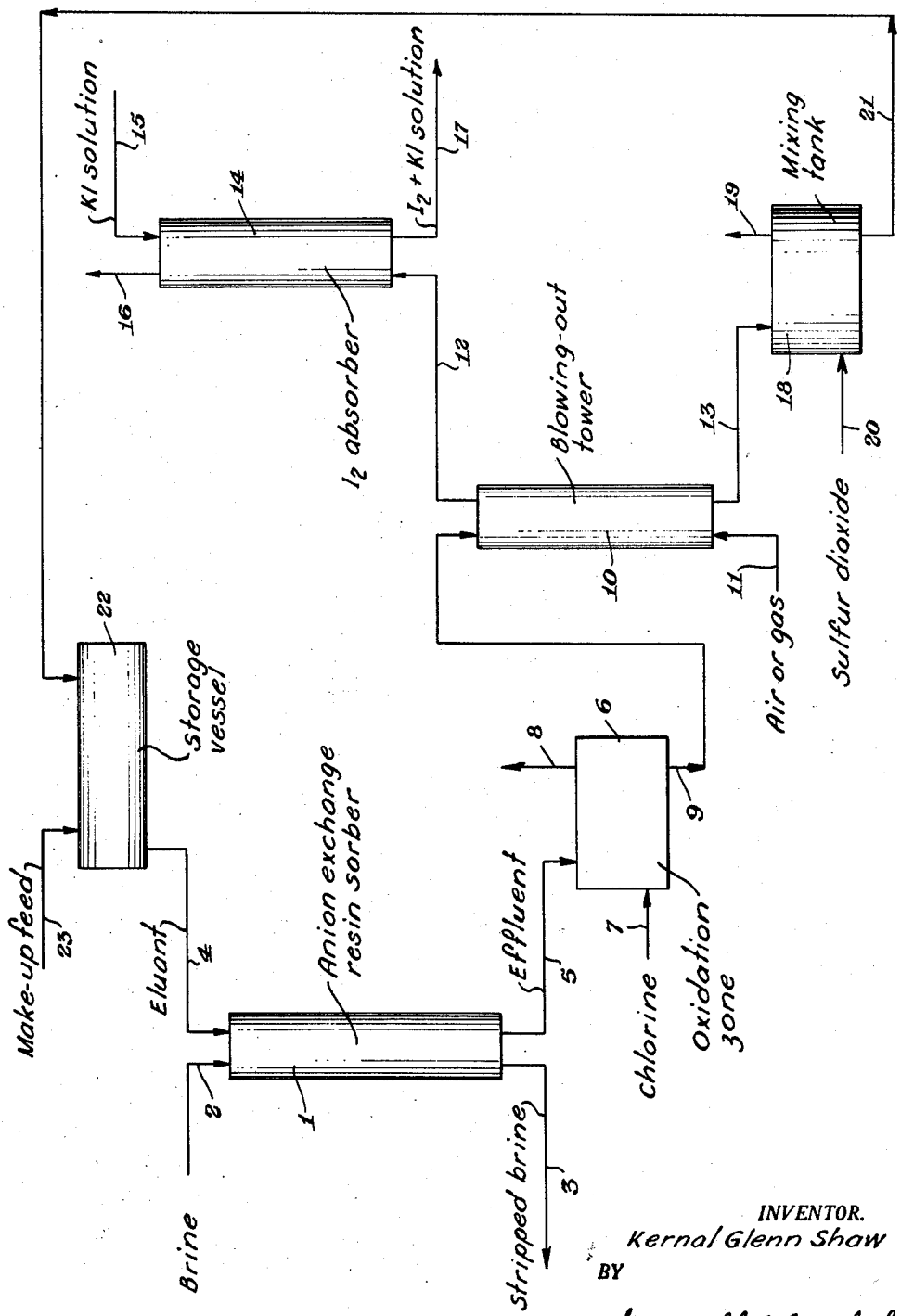
INVENTOR.
Kernal Glenn Shaw
BY
Griswold & Burdick
ATTORNEYS … # 2,945,746
PROCESS FOR RECOVERING IODIDES FROM AQUEOUS SOLUTIONS BY ION EXCHANGE AND CONVERSION OF THE IODIDES TO IODINE Kernal Glenn Shaw, Concord, Calif., assignor to The Dow Chemical Company, Midland, Mich., a corporation of Delaware Filed May 28, 1959, Ser. No. 816,474
8 Claims. (Cl. 23—216)

This invention concerns a process for removing iodides from aqueous solutions with ion exchange resins and pertains especially to a method of removing the adsorbed iodides from the resin. It relates more particularly to a process for removing iodide ions from natural brine with ion exchange resins and recovery of the iodides from the resin and subsequent conversion of the iodides to iodine.

It is known that iodides can be removed from aqueous solutions such as sea water or natural brine by absorbing the iodides on a suitable absorbent or exchange material. Anion exchange resins are commonly employed to absorb and remove ions such as chloride, bromide, iodide, sulfate, nitrate, hydroxide or carbonate ions from fluids, especially aqueous solutions. The adsorbed ions are displaced from the resin by washing with a suitable aqueous regenerant solution, after which the resin is in condition to be re-employed for adsorbing ions from a further quantity of the feed solution. It is also known that the ions differ from one another with respect to the ease with which they are adsorbed by, or displaced from, the resin.

It has been observed in removing iodides from aqueous solutions by sorption of the iodide ions on quaternary ammonium type anion exchange resins that it is difficult to displace the adsorbed iodide ions from the resin and that large quantities of the regenerant solution are usually required to completely displace the adsorbed iodide ions from the resin. This results in low efficiency for a bed of the resin operating on cycles of adsorption and desorption of the iodide ions and also results in the iodide being of low concentration in the eluant solution, which increases the cost and difficulties for the recovery of the iodides as iodine from brine.

It is an object of the invention to provide an improved process for the recovery of iodides as iodine from aqueous solutions such as sea water or brine employing quaternary ammonium anion exchange resins. Another object is to provide an improved method for eluting adsorbed iodide ion from a quaternary ammonium anion exchange resin. A further object is to provide a method for eluting iodide ions from a quaternary ammonium anion exchange resin with an aqueous acidic solution containing an alkali metal salt, e.g. sodium chloride, which method results in substantially complete displacement of the adsorbed iodide ions from the resin into the aqueous eluting solution.

According to the invention there is provided an improved process for the recovery of iodides as iodine from aqueous solutions such as sea water or natural brine, particularly the latter, which consists in the steps of (a) bringing an aqueous iodide-containing salt or brine solution into contact with a quaternary ammonium anion exchange resin and thereby adsorbing iodide ions on the resin; (b) eluting the adsorbed iodide ions from the resin by washing the resin with an aqueous solution of an alkali metal halide such as a chloride or bromide, preferably an acidic solution of an alkali metal chloride or bromide containing from about 10 to about 50 parts by weight of sulfur dioxide per million parts by weight of the solution; (c) oxidizing the iodide ions in the effluent alkali metal salt solution to elemental or free iodine, (d) bringing the oxidized salt solution containing the free iodine into contact with a stream of an inert gas, e.g. air, and vaporizing and removing iodine from the salt solution in the vent gas stream; (e) adsorbing the iodine from the vent gas stream in a suitable liquid such as an aqueous solution of sulfuric acid, hydrogen iodide, potassium iodide, sodium iodide, potassium sulfite, sodium sulfite, potassium bisulfite or sodium bisulfite; and, alternatively, (f) recovering the stripped gases and the stripped aqueous salt solution and recycling said gas and said solution in the process. The invention pertains especially to the combination of steps (a)–(e), and in a preferred embodiment, includes the combination of steps (a)–(f).

The process is described more particularly with reference to the accompanying drawing showing a diagrammatic flow sheet of an arrangement of the principal major elements of apparatus for removing and recovering iodides as iodine from brine.

Referring now to the drawing. The numeral 1 indicates a vertical column substantially filled with a bed of a quaternary ammonium anion exchange resin. The column 1 is provided with inlet 2 and outlet 3 for the feed of brine to, and the withdrawal of brine from, the column, and with inlet 4 and outlet 5 for the feed of eluant solution to, and the withdrawal of effluent liquid from, the column. The effluent liquid is fed via outlet 5 into oxidation zone in vessel 6 which is fitted with an inlet 7 for feed of chlorine into the effluent liquid, a vent 8 and an outlet 9. The oxidized effluent liquid is withdrawn from vessel 6, via outlet 9 and is fed into the top of blowing out tower 10 which is fitted with an inlet 11 for feed of air or other inert gas thereto and with outlets 12 and 13. The gas stream is withdrawn from blowing out tower 10 via outlet 12 and is fed into absorber 14 fitted with an inlet 15 a vent 16 and an outlet 17. The eluant solution is withdrawn from blowing out tower 10 via outlet 13 and is fed to mixing tank 18 having a vent 19, an inlet 20 for feed of sulfur dioxide into the solution, and an outlet 21. The treated eluant solution is withdrawn from mixing tank 18, via outlet 21 and is fed to storage tank 22 from which it is withdrawn via outlet 4 and is fed to column 1 and re-employed in the process to elute adsorbed iodide ions from the anion exchange resin. Storage tank 22 is fitted with an inlet 23 for feed of fresh eluant solution or make up salt solution or acid as needed to bring the eluant solution to the desired concentration of salt solution and pH value. Alternatively, the salt, the sulfur dioxide and the acid, together with water, can be combined in the mixing tank 19 to form a solution having the desired concentration of salt, sulfur dioxide and pH value which is passed via conduit 21 to storage vessel 22.

The anion exchange resins to be employed in the process are quaternary ammonium anion exchange resins, e.g. insoluble cross-linked vinyl aromatic resins such as copolymers of a predominant amount of a monovinyl aromatic hydrocarbon cross-linked with a minor proportion of a divinyl aromatic hydrocarbon and containing on aromatic nuclei of the copolymer substituent groups of the formula

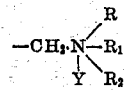

wherein R, $R_1$, and $R_2$ are monovalent hydrocarbon radicals, preferably alkyl radicals containing from 1 to 4 carbon atoms, or wherein R is one such alkyl radical and $R_1$ and $R_2$ are selected from the group consisting of alkyl radicals containing from 1 to 4 carbon atoms and alkanol radicals containing from 2 to 3 carbon atoms such as the ethanol radical or the isopropanol radical, and Y is an anion. Suitable quaternary ammonium type anion exchange resins are those described in U.S. Patents Nos. 2,591,573; 2,597,494; and 2,614,099. In brief a quaternary ammonium anion exchange resin can be prepared by chloromethylating an insoluble crosslinked copolymer of one or more vinyl aromatic hydrocarbons, e.g. a copolymer of from 80 to 98 percent by weight of a monovinyl aromatic hydrocarbon such as styrene, vinyltoluene, vinylxylene, ethylvinylbenzene and the like, cross-linked with from 2 to 20 perecent of divinylbenzene, with a chloromethylating agent such as chloromethyl methyl ether in the presence of a Friedel-Crafts catalyst such as zinc chloride or ferric chloride, whereby chloromethyl radicals are introduced onto aromatic nuclei of the copolymer and thereafter reacting the chloromethylated copolymer with a tertiary amine, suitably trimethylamine, triethylamine, dimethylethanolamine or methyldiisopropanolamine. Quaternary ammonium type anion exchange resins are well known to the art and are available commercially. The anion exchange resin is usually obtained in the form of the chloride salt as initially prepared, and is preferably used in this form to absorb the iodide ions from the brine.

The aqueous eluant solution to be employed for eluting the sorbed iodide ions from the quaternary ammonium anion exchange resin can be an alkali metal salt of a hydrohalic acid, e.g. hydrochloric acid or hydrobromic acid. Examples of suitable alkali metal salts are sodium chloride, potassium chloride, lithium chloride, sodium bromide, potassium bromide or lithium bromide.

The alkali metal salt, e.g. sodium chloride, can be employed in the aqueous eluant solution in a concentration between about 3 percent by weight and that of a saturated solution, but is usually and preferably employed in a concentration corresponding to from about 10 to 25 percent by weight of the solution.

In starting up the process, it is not necessary that the eluant solution employed for eluting the iodide ions from the anion exchange resin in the first cycle of operations be acidic and contain the sulfur dioxide. However, since it is necessary that the effluent liquid from the anion exchange resin containing the iodide ions be made acidic to a pH of 3 or lower, prior to oxidizing the iodide ions therein with chlorine to elemental iodine, for recovering the iodine from the liquid in subsequent steps in the process, it is required that the recovered alkali metal salt solution be treated with the sulfur dioxide and be made acidic to a pH between 2 and 3 when recycled in the process in order to obtain efficient and substantially complete removal of the absorbed iodide ions from the anion exchange resin in all subsequent cycles of operation of the process employing the recovered alkali metal salt solution in whole or in part as the eluant solution. When employing such acidic eluant solutions containing the sulfur dioxide, the adsorbed iodide ions have been found to be displaced from the anion exchange resin in amount corresponding to from 95 to 98 percent of the adsorbed iodide ions over repeated cycles of operation of adsorbing said ions on, and eluting said ions from, the anion exchange resin, whereas similar operations of adsorbing and eluting the iodide ions without sulfur dioxide in the acidic eluant solution results in displacing only about 82 percent of the adsorbed iodide ions from the resin with the same volume of eluant solution.

The eluant solution, i.e. the alkali metal chloride solution containing the small amount of sulfur dioxide, is employed as an acidic solution having a pH of 3 or lower, preferably a pH between 2 and 3. The solution is made acidic by adding a mineral acid thereto, e.g. sulfuric acid, hydriodic acid, hydrobromic acid or hydrochloric acid, preferably the latter. It is not required that the initial eluant solution be acidic for eluting the iodide ions from the anion exchange resin, but it is necessary to employ an acidic eluant solution when the recovered alkali salt solution, after oxidization and removal of the iodine, is recycled to the process.

In practice of the invention for the removing and recovery of iodides as iodine from brine, employing an arrangement of apparatus similar to the flow diagram shown in the drawing, an iodine-containing brine, e.g. on an oil well brine containing iodide ions, is fed to the top of column 1 filled with a bed of a quaternary ammonium anion exchange resin, suitably in the chloride form. The brine is passed downflow through the bed of the anion exchange resin which adsorbs the iodide ions and is discharged or withdrawn from column 1 via outlet 3. After the anion exchange resin has adsorbed its capacity of iodide ions, i.e. the bed of the resin is substantially saturated with respect to its capacity to absorb iodide ions from the brine, the flow of brine through the bed is discontinued. Eluant solution consisting of an aqueous solution of an alkali metal salt, preferably sodium chloride in about 10 percent concentration, having a pH between 2 and 3 and containing from 10 to 50 parts by weight of sulfur dioxide per million parts by weight of the solution, is withdrawn from storage vessel 22 and fed via inlet 4 into column 1 and passed downflow through the bed of the anion exchange resin. The effluent liquid containing the iodide ions which are displaced from the resin is withdrawn from column 1 via outlet 5 and fed to oxidation zone in vessel 6 wherein chlorine gas or chlorine diluted with air, is bubbled into the effluent liquid at temperatures between 25° and 100° C. and in amount sufficient to bring the liquid to an E.M.F. potential between 0.50 and 0.56, preferably between 0.535 and 0.555, as measured by platinum-calomel electrodes. The iodides are thereby oxidized to free or elemental iodine. The oxidized effluent liquid containing free iodine is withdrawn from vessel 6 via outlet 9 and is fed into the top of blowing out tower 10 wherein it is brought into countercurrent contact with a stream of air or other inert gas passing upflow through the tower 10. The air or gas stream containing free iodine vapors is withdrawn from tower 10 via outlet 12 and is fed into the bottom of absorber 14 and into countercurrent contact with an aqueous solution of hydrogen iodide, sulfuric acid, potassium iodide or potassium or sodium sulfite, fed to absorber 14 via inlet 15 and passed downflow through said absorber. The air or gas, free from iodine vapors, is vented from absorber 14 via vent 16. Alternatively, the vent gas can be recycled in the process. The aqueous solution containing the iodine absorbed from the air or gas stream is withdrawn from absorber 14 via outlet 17. The acidic alkali metal chloride solution is withdrawn from blowing out tower 10 via outlet 13 and is fed to mixing tank 18 wherein it is treated with sulfur dioxide in amount sufficient to bring the concentration of the sulfur dioxide in the solution to a value corresponding to from 10 to 50 parts by weight of the sulfur dioxide per million parts by weight of the solution. The sulfur dioxide is bubbled into the liquid via inlet 20. Additional alkali metal chloride, or acid, e.g. sodium chloride or hydrochloric acid, or water can be added to the solution in mixing tank 18, together with the sulfur dioxide to bring the resulting solution to a desired concentration of the alkali metal chloride, a pH value and a concentration of the sulfur dioxide as hereinbefore specified. The so-treated alkali metal chloride solution is withdrawn from mixing tank 18 via outlet 21 and is fed into storage vessel 22 from which it is withdrawn via outlet 4 as needed and employed to elute adsorbed iodide ions from the anion exchange resin. The alkali metal chloride solution is recycled in the process and is employed for eluting iodide ions in repeated cycles of operation in the process.

The process can be carried out employing one or a plurality of two, three, four or more beds of the quaternary ammonium anion exchange resin. Such plurality of beds of the resin can be connected in parallel or series flow as desired. The process can be carried out batchwise or in continuous or semicontinuous manner.

The following examples illustrate ways in which the principle of the invention has been applied but are not to be construed as limiting its scope.

EXAMPLE 1

A column of 4-inches internal diameter by 6 feet long was filled with a granular anion exchange resin in the form of rounded beads of sizes between 20 and 30 mesh per inch as determined by U.S. Standard screens to form a bed of the resin 4 feet deep. The anion exchange resin employed in the experiment was prepared by chloromethylating an insoluble cross-linked copolymer of approximately 94 percent styrene and 6 percent divinylbenzene and reacting the chloromethylated copolymer with trimethylamine. It was a quaternary ammonium anion exchange resin in the chloride form and had a capacity corresponding to 1.325 millequivalents of chloride ions per milliliter of the water-swelled resin beads. The tube was held in a vertical position and was filled with water to the top level of the resin bed. Thereafter, an oil well brine containing 18,900 parts per million (p.p.m.) of chloride ions, 800 p.p.m. of bicarbonate ions, 200 p.p.m. of bromide ions and 76 p.p.m. of iodide ions, per million parts of the brine and having a pH of 7.4 was fed to the top of the column and passed downflow through the bed of the anion exchange resin at a rate corresponding to 10 gallons of the brine solution per minute per square foot of cross-section of the bed of the resin. Approximately 208 gallons of the brine solution were fed to the bed. The anion exchange resin adsorbed about 80 percent of the iodide ions in the feed solution. Thereafter, an aqueous solution containing 10 percent by weight of sodium chloride, sufficient hydrochloric acid to bring the solution to a pH between 2 and 3, and 20 parts by weight of sulfur dioxide per million parts by weight of the solution was fed to the column at a rate corresponding to 5 gallons of the solution per minute per square foot of cross section of the bed of the resin and was passed downflow through the bed to elute the iodide ions from the resin. Approximately 130 gallons of the sodium chloride solution were fed to the column. The effluent liquid was collected and a portion thereof was analyzed for iodide ions. The effluent liquid contained 120 p.p.m. of iodide ions. This corresponds to eluting 98.7 percent of the absorbed iodide ions from the bed of the anion exchange resin.

For purpose of comparison, the bed of the resin was treated with another portion of the brine until it was saturated with respect to adsorbed iodide ions. Thereafter, the adsorbed iodide ions were eluted from the resin by washing the resin with 130 gallons of an aqueous solution containing 10 percent by weight of sodium chloride and sufficient hydrochloric acid to bring the solution to a pH between 2 and 3, which solution was fed to the column at a rate corresponding to 5 gallons of the solution per minute per square foot of cross section of the bed of the resin. The effluent liquid was collected and a portion thereof was analyzed for iodide ions. The effluent liquid contained 100 p.p.m. of iodide ions. This corresponds to eluting only 82.2 percent of the adsorbed iodide ions from the bed of the anion exchange resin.

EXAMPLE 2

In each of a series of experiments, a charge of 114 ml. of the anion exchange resin employed in Example 1 was placed in a 1.2 cm. internal diameter by 150 cms. long long glass tube to form a bed of the resin. The anion exchange resin was saturated with iodide ions from the feed brine solution. Thereafter, the adsorbed iodide ions were eluted from the resin by washing the resin bed with an aqueous saline solution, containing sodium chloride in a concentration as stated in the following table, sufficient hydrochloric acid to bring the solution to a pH between 2 and 3 and about 15 parts by weight of sulfur dioxide per million parts by weight of the solution. The solution was fed to the column at a rate corresponding to 5 gallons of the solution per minute per square foot of cross-section of the resin bed and was passed downflow through the bed of the resin. The effluent liquid was collected as successive fractions and a portion of each fraction was analyzed to determine the proportion of iodide ions therein. Washing of the resin was continued until 95 percent of the sorbed iodide ions were eluted from the resin. Table I identifies the experiments and gives the concentration of the sodium chloride in the eluant solution employed to wash the iodide ions from the resin. The table also gives the total volume of the effluent solution or the amount of the eluant solution required to elute the adsorbed iodide ions from the resin.

Table I

| Run No. | Eluting solution NaCl percent | Effluent solution volume ml. |
|---|---|---|
| 1 | 5 | 9350 |
| 2 | 7.5 | 7850 |
| 3 | 10 | 5700 |
| 4 | 15 | 5400 |
| 5 | 26 | 5700 |

Similar results to those reported in Table I are obtained when employing sodium bromide, lithium chloride, lithium bromide, potassium chloride or potassium bromide in place of the sodium chloride used in the experiment.

EXAMPLE 3

A quaternary ammonium anion exchange resin similar to that employed in Example 1 was placed in a vertical column to form a bed of the resin. The column was filled with water to the top level of the resin bed. Thereafter, an oil well brine containing iodide ions and similar to that described in Example 1 was fed to the column at a rate of 10 gallons per minute of the brine solution per square foot of cross-section of the bed of the resin and was passed down-flow through the resin until the resin had absorbed its capacity of iodide ions. A total volume of approximately 80 volumes of the brine solution per volume of the resin bed were required to substantially saturate the anion exchange resin with iodide ions at the stated rate of flow of the brine solution through the bed. After feed of the brine solution to the bed of the resin, the adsorbed iodide ions were eluted from the resin. The procedure for eluting the iodide ions from the resin was to feed to the column an aqueous acidic solution of 10 weight percent sodium chloride, made acidic with hydrochloric acid to a pH value between 2 and 3, and containing between 10 and 20 parts by weight of sulfur dioxide per million parts by weight of the solution, i.e. treated with from 10 to 20 parts of sulfur dioxide by bubbling the sulfur dioxide into the solution, and pass the solution downflow through the bed of the anion exchange resin containing the adsorbed iodide ions at a rate corresponding to 5 gallons of the acidic sodium chloride solution per square foot of cross-section of the bed of the resin. A total volume of the acidic sodium chloride solution corresponding to 50 times the volume of the bed of the resin was used to elute the iodide ions from the resin. The effluent liquid was collected and found to contain 90 p.p.m. of iodide ions. The effluent liquid was treated with chlorine by bubbling chlorine gas into the solution at temperatures between 20° and 30° C. in amount sufficient to bring the solution to an e.m.f. potential of 0.54 volt as measured by platinum-calomel electrodes, thereby oxidizing the iodide ions in the solution to iodine. The oxidized solution was fed to the top of a blowing out tower comprising a 3 inch diameter tube 48 inches long substantially filled with ½ inch ceramic Raschig rings. The solution was trickled down-flow through the tower at temperatures between 25° and 30° C. and in counter-current contact with a stream of air passing upflow through the tower at a ratio of 42 cubic feet of air per gallon of the solution. The air stream flowing from the blowing out tower and containing the iodine vapors was passed upflow through an absorbing tower consisting of a 3 inch diameter glass tube 48 inches long substantially filled with ½ inch ceramic Raschig rings, and into contact with an aqueous solution of sodium bisulfite flowing downflow through the absorbing tower whereby the iodine in the air stream was recovered by absorption in the aqueous potassium iodide solution. The effluent sodium chloride solution from the blowing out tower was withdrawn as a solution substantially free from iodine. This solution was treated with 20 parts by weight of sulfur dioxide per million parts by weight of the solution by bubbling the sulfur dioxide gas into the solution. Hydrochloric acid was added as needed to bring the solution to a pH value between 2 and 3. The solution was then recycled in the process and re-employed to elute adsorbed iodide ions from the anion exchange resin in successive cycles of the operations just described. The experiment was continued for a plurality of cycles of the operations wherein the acidic sodium chloride solution containing from 10 to 20 parts by weight of sulfur dioxide per million parts by weight of the solution was used to elute adsorbed iodide ions from the anion exchange resin, the effluent liquid was oxidized with chlorine to liberate the iodine, the iodine was displaced by blowing the solution with air and the iodine was recovered from the air stream, and the blown acidic sodium chloride solution was treated with sulfur dioxide then re-employed to elute adsorbed iodide ions from the anion exchange resin. Over the plurality of operations, the acidic sodium chloride solution was found to readily elute from 95 to 98 percent of the adsorbed iodide ions from the anion exchange resin.

I claim:

1. A process for removing and recovering iodide ions as iodine from aqueous solutions, which process comprises bringing a brine containing iodide ions into contact with a quaternary ammonium anion exchange resin and adsorbing iodide ions on the resin, then eluting the adsorbed iodide ions from the resin by washing the resin containing the adsorbed iodide ions with an aqueous acidic solution of an alkali metal halide salt of the group consisting of chloride and bromide, containing said salt in a concentration between about 3 percent by weight and that of a substantially saturated solution and from about 10 to about 50 parts by weight of sulfur dioxide per million parts by weight of said aqueous solution, said acidic solution having a pH between 2 and 3, collecting effluent liquid containing the eluted iodide ions and adding chlorine in amount sufficient to bring the resulting solution to an E.M.F. potential between 0.50 and 0.56 as measured by platinum-calomel electrodes and thereby oxidizing the iodides to elemental iodine, contacting the solution containing elemental iodine with a stream of an inert gas thereby displacing the elemental iodine from the solution as vapors of iodine in the gas stream and recovering the vaporized iodine from the gas, withdrawing aqueous alkali metal halide salt solution substantially free from elemental iodine from contact with the stream of inert gas and treating said aqueous liquid with sulfur dioxide in amount sufficient to bring the concentration of the sulfur dioxide in the solution to a value corresponding to from 10 to 50 parts by weight of the sulfur dioxide per million parts by weight of said liquid, acidifying the solution to a pH value between 2 and 3 and re-employing the so-treated alkali metal halide salt solution in the process for eluting adsorbed iodide ions from the quaternary ammonium anion exchange resin in successive cycles of the operations described above.

2. A process as claimed in claim 1, wherein the aqueous alkali metal salt solution is an aqueous solution of sodium chloride.

3. A process for removing and recovering iodide ions as iodine from an aqueous brine solution, which process comprises bringing a natural brine containing iodide ions into contact with a quaternary ammonium anion exchange resin and adsorbing iodide ions on the resin, then eluting the adsorbed iodide ions from the resin by washing the resin containing the adsorbed iodide ions with an aqueous acidic solution of sodium chloride having a pH between 2 and 3 containing sodium chloride in a concentration of from about 5 to 26 percent by weight of the solution and sulfur dioxide in amount corresponding to from about 10 to 50 parts by weight of the sulfur dioxide per million patrs by weight of the solution, collecting effluent liquid cotnaining the eluted iodide ions and adding chlorine to the acidic solution having a pH between 2 and 3 in amount sufficient to bring the resulting solution to an E.M.F. potential between 0.50 and 0.56 as measured by platinum-calomel electrodes and thereby oxidizing the iodides to elemental iodine, contacting the solution containing elemental iodine with a stream of air thereby displacing the elemental iodine from the solution as vapors of iodine in the air stream and recovering the vaporized iodine from the stream of air, withdrawing aqueous acidic sodium chloride solution substantially free from elemental iodine and iodide ions from contact with the air stream and treating said aqueous sodium chloride solution with sulfur dioxide in amount sufficient to bring the concentration of the sulfur dioxide in the solution to a value corresponding to from about 10 to 50 parts by weight of the sulfur dioxide per million parts by weight of the solution and re-employing the so-treated acidic solution in the process for eluting adsorbed iodide ions from the quaternary ammonium anion exchange resin in successive cycles of the operations described above.

4. A process as claimed in claim 3, wherein the aqueous sodium chloride solution contains from 5 to 15 percent by weight of sodium chloride.

5. A process as claimed in claim 3, wherein the quaternary ammonium anion exchange resin is an insoluble cross-linked vinyl aromatic resin containing substituent groups of the formula

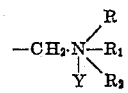

wherein R, $R_1$, and $R_2$ are alkyl radicals containing from 1 to 4 carbon atoms and Y is an anion, as the reactive groups on aromatic nuclei in the resin.

6. In a process for separating and recovering iodide ions as iodine from an aqueous solution wherein a brine containing iodide ions is brought into contact with a quaternary ammonium anion exchange resin and the iodide ions are adsorbed on the resin, and wherein the adsorbed iodide ions are eluted from the resin and subsequently converted to iodine, the improvement which consists in eluting the adsorbed iodide ions from the resin by washing the anion exchange resin containing the adsorbed iodide ions with an aqueous acidic solution having a pH between 2 and 3 and containing an alkali metal halide salt of the group consisting of chloride and bromide, in a concentration between 5 percent by weight and that of a substantially saturated solution and from about 10 to about 50 parts by weight of sulfur dioxide per million parts by weight of the solution and collecting effluent liquid containing the displaced iodide ions.

7. A process as claimed in claim 6, wherein the alkali metal chloride salt is sodium chloride.

8. A process as claimed in claim 6, wherein the alkali metal chloride salt is sodium chloride in a concentration between about 5 and 15 percent by weight of the solution.

References Cited in the file of this patent

UNITED STATES PATENTS 2,676,092 Allen _____ Apr. 26, 1954
2,780,528 Fossan et al. _____ Feb. 5, 1957